United States Patent [19]
Akiyama et al.

[11] 4,087,636
[45] May 2, 1978

[54] TRANSMIT-RECEIVE CIRCUIT CHANGING SWITCH SYSTEM

[75] Inventors: Masaki Akiyama; Okie Tani, Tokyo, Japan

[73] Assignee: Tani Denki Kogyo Kabushiki Kaisha, Tokyo, Japan

[21] Appl. No.: 688,911

[22] Filed: May 21, 1976

[30] Foreign Application Priority Data

May 28, 1975 Japan .................................. 50-64671
Jun. 19, 1975 Japan .................................. 50-74720
Jun. 24, 1975 Japan .................................. 50-77671

[51] Int. Cl.² ............................................. H04Q 7/04
[52] U.S. Cl. .............................. 179/2 EA; 179/1 VC; 325/152
[58] Field of Search ............... 179/41 A, 2 E, 1 VC, 179/1 H; 325/21, 22, 152, 55; 343/175

[56] References Cited

U.S. PATENT DOCUMENTS

| | | | |
|---|---|---|---|
| 3,189,690 | 6/1965 | Millett | 179/1 VC |
| 3,189,691 | 6/1965 | Simpson | 179/1 VC |
| 3,366,880 | 1/1968 | Driver | 325/152 |
| 3,397,401 | 8/1968 | Winterbottom | 325/152 |
| 3,897,592 | 7/1975 | Walker | 179/41 A |

Primary Examiner—Kathleen H. Claffy
Assistant Examiner—Gerald L. Brigance
Attorney, Agent, or Firm—Haseltine, Lake & Waters

[57] ABSTRACT

In a press-to-talk system of radio telephone communication, the operator's voice signal actuates a switching signal generator to generate a transmit-receive circuit changing signal which connects the circuit of the radio telephone equipment for transmission or for standby. The audio-frequency signal from the output of the receiver of the radio telephone equipment is properly isolated from the input to the switching signal generator.

In this way, the press-to-talk manual switch is successfully eliminated and the operator can use his hands for other works while he is performing the radio telephone communication. This elimination of the press-to-talk manual switch is advantageous for a radio telephone operator when he is driving a car, working at a construction or a quarrying site, or when he is engaged in a fire extinguishing operation.

6 Claims, 13 Drawing Figures

TRANSMIT-RECEIVE CIRCUIT CHANGING SWITCH SYSTEM

BACKGROUND OF THE INVENTION

The present invention relates to a transmit-receive circuit changing switch system for a radio telephone equipment, and more particularly to a system in which the press-to-talk manual switch is eliminated.

Radio telephone communication is operated under various sets of circumstances. In some of these sets of circumstances, the operator of the radio telephone equipment must perform the necessary communication while he is simultaneously engaged in other activities.

For example, a driver of a vehicle must communicate by his radio telephone equipment while he is steering the vehicle, a worker at a construction or a quarrying site must use his radio telephone equipment while he is executing his job at the site, and a fireman must use his radio telephone equipment while he is engaged in a fire extinguishing operation.

In all the heretofore known press-to-talk system of radio communication equipment, a press-to-talk manual switch is indispensable and the operator must use his hand to actuate this press-to-talk switch. This manual operation of the press-to-talk switch will be very cumbersome and sometimes dangerous for a car driver, for a construction worker, or for a fireman.

BRIEF SUMMARY OF INVENTION

Accordingly, it is the general object of the present invention to provide a transmit-receive circuit changing switch system in which the press-to-talk manual switch is eliminated.

More particularly, an object of this invention is to provide a transmit-receive circuit changing switch system which is operated by an electric signal generated by a switching signal generator means from a low-frequency signal produced by the operator's voice.

Another object of this invention is to provide a circuit system which can isolate the audio-frequency signal which is the output of the receiver of the radio telephone equipment from the input circuit of the switching signal generator means.

Still another object of this invention is to provide a switching signal generator means which is operated by a pulse signal produced from the operator's voice.

Further object of this invention is to provide a switching signal generator means which is operated by a pair of successive two pulses, in order to avoid the misoperation by a single noise pulse.

For a better understanding of the invention, its operating advantages, and specific objects attained by its use, reference should be had to the accompanying drawings and descriptive matter in which there are illustrated and described several preferred embodiments of this invention.

DETAILED DESCRIPTION OF THE INVENTION

Figure 1:
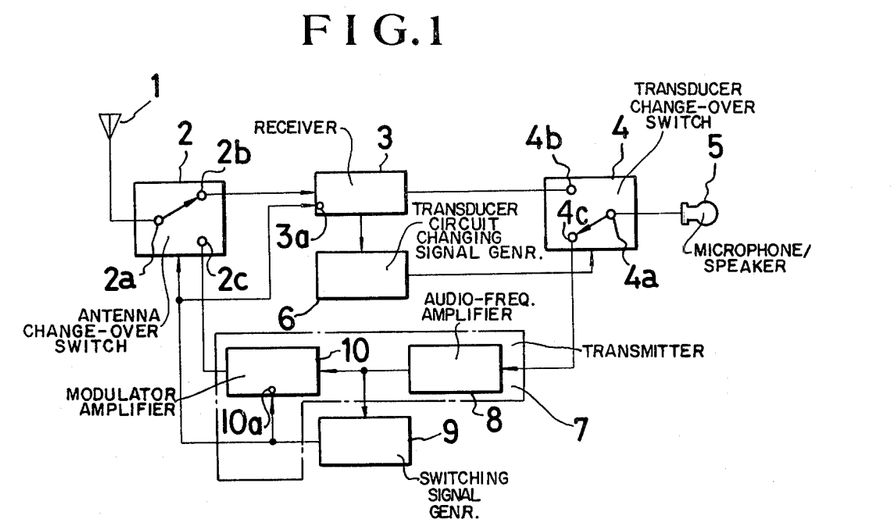
FIG. 1 is a schematic block diagram of an embodiment of this invention in which the radio telephone equipment is connected in a standby connection.

Referring now to the drawings, wherein like reference numerals designate like or corresponding parts throughout the drawings, FIG. 1 illustrates a schematic block diagram of an embodiment of this invention.

Reference numeral 1 is an antenna for transmission and for reception of a radio telephone equipment. The terminal of the antenna 1 is connected to a contact 2a of an antenna change-over switching means 2. The first fixed contact 2b of the antenna change-over switching means 2 is connected to the input terminal of a receiver 3 of the radio telephone equipment. The output of the receiver 3 which delivers the audio-frequency output signal, is connected to the first fixed contact 4b of an electroacoustic transducer change-over switching means 4. To a contact 4a of this electroacoustic transducer change-over switching means 4 is connected an electroacoustic transducer 5 which is used as a microphone and as a speaker.

Reference numeral 6 is a means for generating transducer circuit changing signal by detecting the radio-frequency signal from the receiver 3. The output signal of the means 6 controls the change-over switching means 4.

The second fixed contact 4c of the transducer change-over switching means is connected to the input of an audio-frequency amplifier 8 of a transmitter 7 of the radio telephone equipment. The output of the audio-frequency amplifier 8 modulates a radio-frequency signal at a modulator amplifier 10, and the output of the modulator amplifier 10 is connected to the second fixed terminal 2c of the antenna change-over switching means 2.

The antenna change-over switching means 2 is controlled by the output signal of a switching signal generator means 9 which generates a transmit-receive circuit changing electric signal from the low-frequency signal delivered through the audio-frequency amplifier 8.

This output of the switching signal generator means 9 also controls the receiver 3 and the modulator amplifier 10, disabling the receiver during the transmitting mode.

In operation, the radio telephone equipment is connected as shown in FIG. 1 during the standby mode. In this connection of FIG. 1, the output of the receiver 3 is disconnected from the transducer at the contact 4b, and this disconnection is effective for the purpose of squelching.

Figure 2:
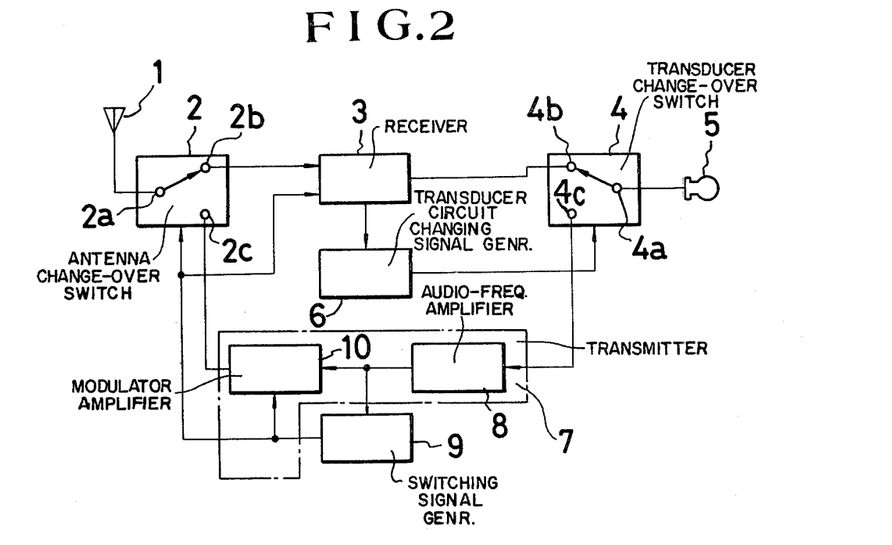
FIG. 2 is a schematic block diagram of the same embodiment as shown by FIG. 1 in which the radio telephone equipment is connected in a receiving connection.

When a radio-frequency signal is received by the receiver 3, this radio-frequency signal is detected by the means 6 for generating transducer circuit changing signal, and an electric signal is generated and supplied to the transducer change-over switching means 4. This electric signal from the means 6 connects the contact 4a to the first fixed contact 4b, establishing the receiving mode as shown by FIG. 2. In the receiving mode of FIG. 2, the radio-frequency signal from the antenna 1 is received by the receiver 3 through the contacts 2a and 2b, amplified and detected by the receiver 3, and the audio-frequency output signal is transmitted through the contacts 4b and 4a to the transducer 5 where the signal is converted to an audible sound signal.

In this connection of FIG. 2, the input of the audio-frequency amplifier 8 is disconnected from the transducer 5 at the contact 4c, and therefore the output of the switching signal generator means 9 is the electric signal corresponding to the no input low-frequency signal. This output signal of the switching signal generator means 9 corresponding to the no input low-frequency signal will be called the inverted output signal, and this inverted output signal of the switching signal generator means 9 disables the modulator amplifier 10.

When the input radio-frequency signal from the antenna 1 disappears, the contact 4a of the transducer change-over switching means 4 returns to the second fixed contact 4c and the connection of the radio telephone equipment returns to the standby mode as shown by FIG. 1.

In this connection of FIG. 1, when a voice signal is transmitted to the input surface of the transducer 5, the voice signal is converted to a corresponding audio-frequency signal which is delivered to the input of the audio-frequency amplifier 8 through the contact 4c. The switching signal generator means 9 receives the amplified audio-frequency signal from the output of the audio-frequency amplifier 8 and generates a transmit-receive circuit changing signal which controls the antenna change-over switching means 2 and connects the contact 2a to the second fixed contact 2c. Thus, the circuit of the radio telephone equipment is connected in the transmitting mode as shown in FIG. 3.

Figure 3:
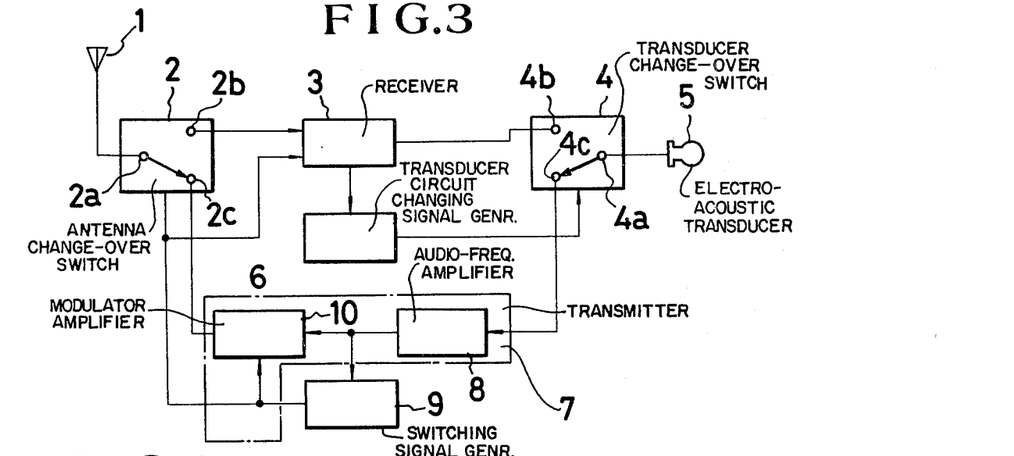
FIG. 3 is a schematic block diagram of the same embodiment as shown by FIG. 1 in which the radio telephone equipment is connected in a transmitting connection.

In this connection of FIG. 3, the amplified audio-frequency signal from the output of the audio-frequency amplifier 8 modulates the radio frequency at the modulator amplifier 10, and the modulated and amplified radio-frequency signal through the contacts 2c and 2a is radiated from the antenna 1. The output signal from the switching signal generator means 9 also disables the receiver 3.

Throughout the foregoing description, it has been implicitly assumed that the modulator amplifier 10 has a control signal input terminal 10a through which the transmit-receive circuit changing signal from the switching signal generator 9 is an input for enabling the operation of the modulator amplifier 10, the operation of the modulator amplifier 10 being disabled by the absence of the transmit-receive circuit changing signal provides an input for disabling the operation of the receiver 3, the operation of the receiver 3 being enabled by the absence of the transmit-receive circuit changing signal.

The transmit-receive circuit changing signal is a signal having a rectangular waveform which is generated at the switching signal generator means 9 from the audio-frequency signal of the output of the electroacoustic transducer 5, and several preferred embodiments for generating this transmit-receive circuit changing signal will be described in later paragraphs.

The audio-frequency signal which is the output of the receiver 3 must be prevented from entering the switching signal generator 9. In the embodiment shown by FIG. 3, this isolation is accomplished by the transducer change-over switch 4 where the contact 4b for the output of the receiver 3 is isolated from the contact 4c for the input of the audio-frequency amplifier 8.

Other embodiments of the means for this isolation will be described in connection with FIG. 4, FIG. 5, FIG. 6, and FIG. 7. It must be noted that, in FIG. 4, FIG. 6, and FIG. 7, the switching signal generator means 9 is separated from the transmitter 7.

Figure 4:
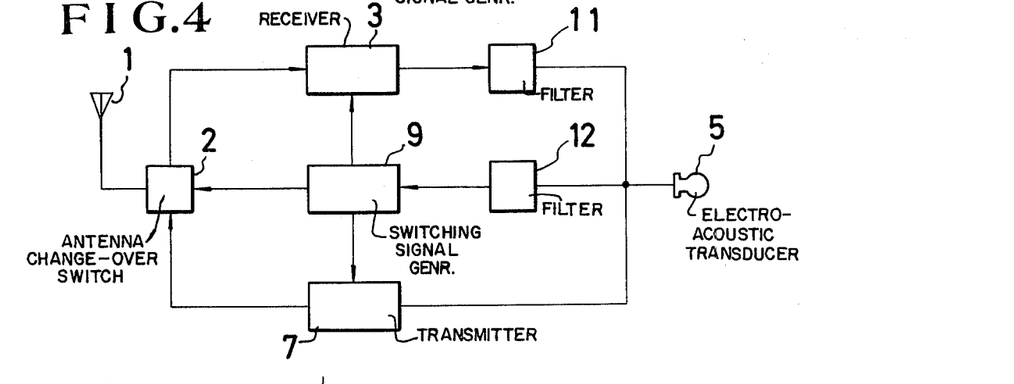
FIG. 4 is a schematic block diagram of another embodiment of this invention.
Figure 6:
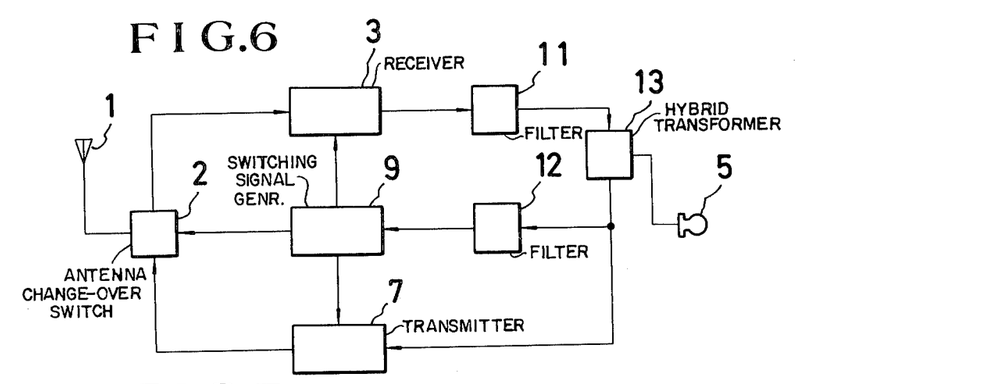
FIG. 6 is schematic block diagram of an embodiment of this invention, which is a modification of the embodiment as shown by FIG. 4.
Figure 7:
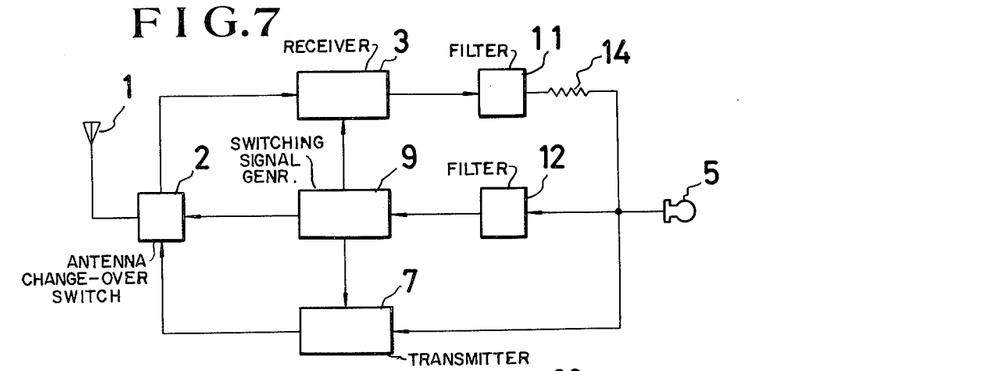
FIG. 7 is a schematic block diagram of an embodiment of this invention, which is another modification of the embodient as shown by FIG. 4.

And it is to be understood that an audio-frequency amplifier is included in the switching signal generator means 9 and in the transmitter 7 in FIGS. 4, 6 and 7. Also, it must be noted that the transducer change-over switch 4 is omitted in the embodiments shown by FIGS. 4, 6 and 7, and the transducer 5 is always connected in parallel both to the output of the receiver 3 and to the input of the switching signal generator means 9.

FIG. 4 shows another embodiment of this invention. The antenna 1 is connected through an antenna change-over switching means 2 either to a receiver 3 or to a transmitter 7 of the radio telephone equipment. The antenna change-over switching means 2 is controlled by the output signal of a switching signal generator means 9.

The output of the receiver 3 is connected to an electroacoustic transducer 5 through a first filter means 11. The output of this electroacoustic transducer 5 is connected directly to the modulation signal input of the transmitter 7 and, through a second filter means 12, to the input of the switching signal generator means 9. The output signal from the switching signal generator means 9 is the transmit-receive circuit changing electric signal which controls the receiver 3, the transmitter 7, and the antenna change-over switching means 2.

Figure 5:
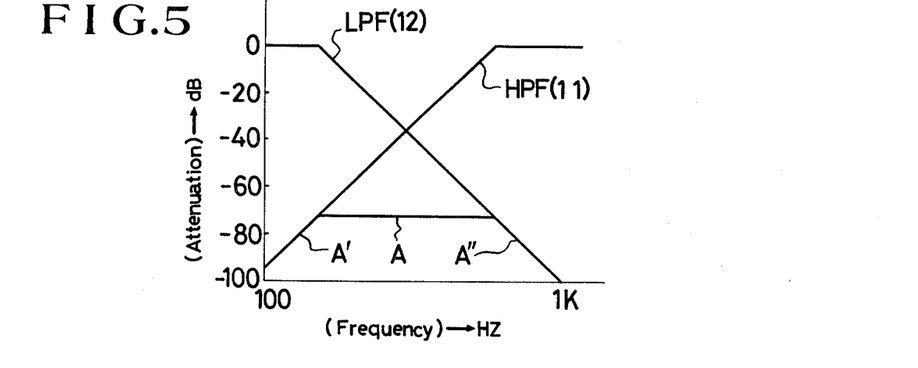
FIG. 5 is a graph representing the attenuation to frequency characteristics of the filters employed in the embodiment shown in FIG. 4.

One example of the attenuation-to-frequency characteristics of the first filter means 11 and the second filter means 12 is represented by the graphs of FIG. 5. In this example as shown by FIG. 5, the first filter means 11 is a high-pass-filter(HPF) and the second filter means 12 is a low-pass-filter(LPF), and the break point of the first filter means 5(HPF) is designed to be at about 600 Hz while the break point of the second filter means 7(LPF) is designed to be at about 150 Hz.

In operation, the lower frequency components in the audio-frequency signal output from the receiver 3 is attenuated through the first filter means 11 and is delivered to the transducer 5 which functions as a speaker. As is well known in this technological field, the attenuation in the lower frequency components has only a little effect on the articulation of the speech when the break point of the high-pass-filter 11 is properly selected, and the radio telephone signal of the output of the receiver 3 is clearly understood after the attenuation by the first filter means 11.

The output signal from the first filter means 11 is further attenuated by the second filter means 12 in the path to the input of the switching signal generator means 9. The overall attenuation from the output of the receiver 3 to the input of the switching signal generator means 9 will be as shown by line segments A', A, A" in FIG. 5. The amount of this attenuation is −72 dBs at A in the example in FIG. 5, and therefore, the output audio-frequency signal from the receiver 3 cannot actuate the switching signal generator means 9.

On the other hand, the audio-frequency signal generated by the transducer 5 when the transducer 5 is functioning as a microphone, is attenuated only by the second filter means 12 which is a low-pass-filter, in the path to the input of the switching signal generator means 9. The lower frequency components of the audio-frequency signal generated by the transducer 5 will have a sufficient amplitude at the input of the switching signal generator means 9 to actuate the switching signal generator means 9, since these components are not attenuated by the second filter means 12.

Thus, the switching signal generator means 9 is actuated by the low-frequency signal generated by the transducer 5 and the transmit-receive circuit changing signal is transmitted to the antenna change-over switching means 2, the receiver 3, and the transmitter 7. During the presence of the transmit-receive circuit changing signal, the antenna 1 is connected to the transmitter 7, the receiver 3 is disabled, the transmitter 7 is enabled, while, during the presence of the inverted output signal of the switching signal generator means, the antenna 1 is connected to the receiver 3, the receiver 3 is enabled, and the transmitter 7 is disabled.

FIG. 6 shows a modification of the embodiment of FIG. 4, and in this embodiment of FIG. 6, a hybrid transformer 13 is inserted between the first filter means 11 and the second filter means 12. As is well known in this technological field, the output of the first filter means 11 is transmitted to the transducer 5 with no appreciable attenuation through the hybrid transformer 13, while the signal from the first filter means 11 to the second filter means 12 is sufficiently attenuated by the hybrid transformer 13. Therefore, 60–70 dB isolation will be added for the output signal of the receiver 3 to enter into the input of the switching signal generator means 9 by the hybrid transformer 13, resulting in the total attenuation of −130 – −140 dB from the output of the receiver to the input of the switching signal generator means 9.

FIG. 7 shows another modification of FIG. 4, and in the embodiment of FIG. 7, an impedance element 14 is connected between the output of the first filter means 11 and the transducer 5 for the purpose of the impedance matching.

In the foregoing descriptions in connection with FIG. 4, the attenuation-to-frequency characteristics of the first filter means 11 and the second filter means 12 are assumed as represented by FIG. 5. It must be noted, however, that it will be easy for a person skilled in the art to design a combination of filters which can produce a similar effect as described in the foregoing paragraphs from filter elements which have frequency characteristics different from those shown in FIG. 5.

And, in the embodiments of FIG. 1 and FIG. 4, a single electroacoustic transducer 5 is used as a speaker and as a microphone. An ear-plug type electroacoustic transducer which can be used as a speaker and as a microphone with the transducer inserted in the operator's ear, will be most adapted to be used in the system of this invention. But, it should be understood that the system of this invention is not limited by a particular type of the transducer. It will be obvious that, in the transmit-receive circuit changing switch system of this invention, two electroacoustic transducers may be used, one transducer for a speaker and the other transducer for a microphone.

When one transducer is used for a speaker and the other transducer is used for a microphone, the means for isolating the low-frequency signal which is transmitted to the switching signal generator means 9 from the voice signal which is the output of the receiver 3, will become very simple. The sound oscillation output from the speaker can be easily isolated from the sound oscillation input to the microphone by a conventional method, and the input of the switching signal generator means 9 will be isolated from the audio-frequency signal which is the output of the receiver 3 of the radio telephone equipment.

Figure 8:
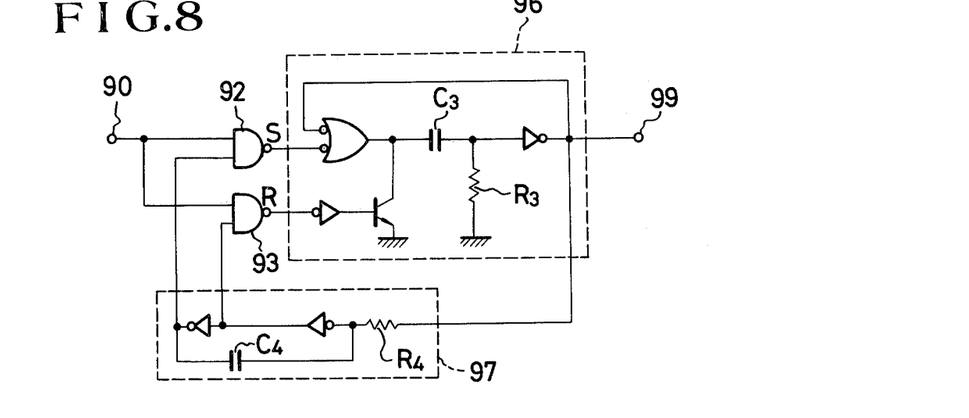
FIG. 8 is a circuit diagram of an embodiment of the switching signal generator means which is used in the system of this invention.

Referring now to FIG. 8, there is shown an embodiment of the switching signal generator means 9 used in the system of this invention. The switching signal generator means 9 may be a limiter-amplifier which amplifies the audio-frequency signal input from the audio-frequency amplifier 8 of FIG. 1 or from the electroacoustic transducer 5 of FIG. 4 to a point of saturation and rectifies the saturated signal, the saturated and rectified signal being used as the transmit-receive circuit changing signal. But, this type of voice operator transmit-receive circuit changing signal has an important drawback when the signal to noise ratio at the input of the switching signal generator means (that is, at the output of the electro-acoustic transducer or at the output of the audio-frequency amplifier which amplifies the output from the transducer) is not sufficiently large. In case when an ear-plug type transducer is used as a microphone with the transducer inserted in the operator's ear, the operator's voice is substantially attenuated in the sound path to the microphone and the signal to noise ratio is not sufficiently high resulting in the high probability of misoperation by noise of the switching signal generator means. Therefore, the switching signal generator means 9 as illustrated by the circuit diagram of FIG. 8 is preferred in the system of this invention.

In FIG. 8, reference numeral 90 represents the input terminal of the audio-frequency signal from the audio-frequency amplifier 8 of FIG. 1 or from the second filter means 12 of FIG. 4.

The operator of the radio telephone equipment can generate an impulsive sound of a high peak intensity at the sound input surface of the ear-plug type transducer which is inserted in his ear, by clattering his teeth, by clicking his tongue, or by choking down his saliva. This inpulsive sound of a high peak intensity generated by the operator's particular voice is converted to an electric pulse signal by the transducer 5 and is applied to the input terminal 90.

This pulse signal applied to the terminal 90 by the operator's particular voice triggers the switching signal generator means. A block 96 which is represented by a dotted line is a monostable multivibrator, having a set terminal S and a reset terminal R. The output of a gate 92 is connected to the set terminal S, and the output of another gate 93 is connected to the reset terminal R. A block 97 which is also represented by a dotted line is a delay means which produces a predetermined amount of time delay to the signal input. The output of the monostable multivibrator 96 is connected to the input of the delay means 97, and the inverted output of the delay means 97 is connected to one input of the gate 92 while the non-inverted output of the delay means 97 is connected to one input of the gate 93. The other input of the gate 92 and gate 93 is the signal at the terminal 90.

Figure 9:
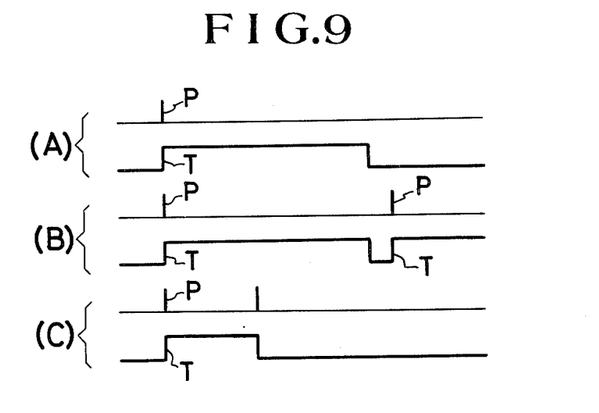
FIG. 9 is a performance time chart illustrating the performance of the switching signal generator means as shown by FIG. 8.

Referring now to the performance time chart of FIG. 9, the operation of the switching signal generator means of FIG. 8 will be explained. The pulse signal generator at the terminal 90 by the operator's particular voice has a sufficiently high peak voltage and will be easily discriminated from the noise by the difference of the peak voltage level, and the monostable multivibrator 96 can be triggered by a signal having a sufficiently large signal to noise ratio.

When the multivibrator 96 is in a reset state, the pulse signal from the terminal 90 is transmitted through the gate 92 to the set terminal S of the multivibrator 96 and triggers-on the multivibrator 96. The set state of the multivibrator 96 continues for a predetermined time duration which is determined by the time constant composed of the capacitor $C_3$ and the resistor $R_3$, and after that predetermined time duration, the multivibrator is automatically restored to the reset state. This is represented by the performance time chart (A) of FIG. 9. In the performance time chart of FIG. 9, the input signal is denoted by P, and the output signal of the switching signal generator means is denoted by T. The high voltage level signal of T connects the radio telephone equipment for a transmitting mode and the low voltage level signal of T connects the radio telephone equipment for a receiving mode.

If the operator wishes to keep the radio telephone equipment in transmitting mode for a time duration longer than that determined by the time constant $C_3R_3$, he must produce another particular voice signal after the multivibrator 96 is automatically restored to the reset state. This operation is represented by the performance time chart (B) of FIG. 9.

If the operator wishes to connect the radio telephone equipment in the receiving mode during the time when the multivibrator 96 is in a set state and the radio telephone equipment is connected in a transmitting mode, the operator has to produce the particular voice signal. This voice signal will generate a pulse signal at the terminal 90 of FIG. 8 and the pulse signal is transmitted through the gate 93 to the reset terminal R of the multivibrator 96 resetting the multivibrator and connecting the radio telephone equipment in a receiving mode. This operation is represented by the performance time chart (C) of FIG. 9.

It will be easily understood for a person skilled in the art of this technological field that the delay means 97 is provided to prevent the chattering of the multivibrator. If there is not a time delay in the control of the gate 92 and gate 93, the pulse signal at the terminal 90 will be transmitted alternatively to the set terminal S and the reset terminal R for a duration of the time width of the pulse at the terminal 90, resulting in a set-reset chattering of the multivibrator 96. The amount of this delay is determined by the time constant composed of a capacitor $C_4$ and resistor $R_4$.

Figure 10:
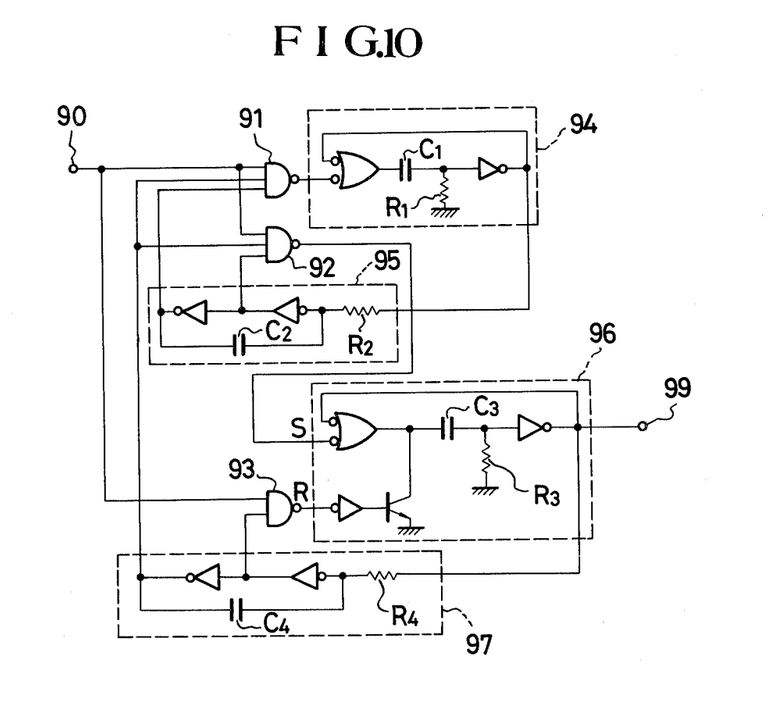
FIG. 10 is a circuit diagram of another embodiment of the switching signal generator means which is used in the system of this invention.

FIG. 10 shows another embodiment of the switching signal generator means which is used in the system of this invention. As described in the foregoing paragraphs in connection with FIG. 8, the radio telephone operator can trigger the switching signal generator means of FIG. 8 with a sufficient reliability by producing an impulsive sound of a high peak intensity at the sound input surface of an ear-plug type transducer which is inserted in his ear, through clattering his teeth, through clicking his tongue, or through choking down his saliva. But a single noise pulse of comparatively high peak intensity can be transmitted to the sound input surface of the transducer by some accident, resulting in the misoperation of the switching signal generator means. The embodiment illustrated by the circuit of FIG. 10 can prevent this misoperation and improves the reliability of the switching signal generator means.

In the embodiment shown by FIG. 10, a pair of successive two pulses or a pulse of a predetermined width triggers-on the monostable multivibrator 96 and a single pulse triggers-off the monostable multivibrator.

The terminal 90 in FIG. 10 is the input terminal of the low-frequency signal from the audio-frequency amplifier 8 of FIG. 1 or from the second filter means 12 of FIG. 4. This input terminal is connected to one input of each gate of a gate 91, a gate 92, and a gate 93 of FIG. 10. The output of the gate 91 is connected to the set terminal of the first monostable multivibrator 94, and the output of the first multivibrator 94 is connected to the input of a first delay means 95. The inverted output of the first delay means 95 is connected to one input of the gate 91 and the non-inverted output of the first delay means 95 is connected to one input of the gate 92.

The output of the second gate 92 is connected to the set terminal S of the second monostable multivibrator 96. The output of the second multivibrator 96 is connected to the input of a second delay means 97. The inverted output of the second delay means 97 is connected to the third input of each of the first gate 91 and the second gate 92, and the non-inverted output of the second delay means 97 is connected to one input of the third gate 93. The output of the third gate 93 is connected to the reset terminal R of the second multivibrator means 96.

The function of the first delay means 95 and the second delay means 97 of FIG. 10 is the same with the function of the delay means 97 of FIG. 8 and will need no further explanation.

The operation of the circuit of FIG. 10 will be explained in connection with the performance time chart of FIG. 11. When the first monostable multivibrator 94 and the second monostable multivibrator 96 are both in the reset state, the input pulse $P_1$ at the input terminal 90 is transmitted through the first gate 91 to the set terminal of the first monostable multivibrator 94, triggering-on the multivibrator 94. The output of the multivibrator 94 becomes at a high voltage level for a duration of $t_1$ as shown by the waveform $(T_1)$ of FIG. 11. The duration of $t_1$ is determined by the time constant composed of a capacitor $C_1$ and a resistor $R_1$. After a time delay of $d_1$ from the instant when the first multivibrator 94 is triggered-on, the first gate 91 will become non-conductive as shown by the waveform $(G_1)$ of FIG. 11 because of the signal input from the inverted output of the first delay means 95, and the second gate 92 will become conductive because of the signal input from the non-inverted output of the first delay means 95. The duration of $d_1$ is determined by the time constant composed of a capacitor $C_2$ and a resistor $R_2$.

The duration of $t_1$ is predetermined to be larger than the duration of $d_1$ and the duration of $d_1$ is predetermined to be larger than the width of the input pulse $P_1$. The interval between the successive two input pulses is selected to be larger than $d_1$ and smaller than $t_1$, and therefore, the second input pulse $P_2$ arrives to the input terminal when the first gate 91 is non-conductive and the second gate 92 is conductive.

The second input pulse $P_2$ is, therefore, transmitted through the second gate 92 to the set terminal S of the second multivibrator 96, triggering-on the multivibrator 96. The set state of the multivibrator 96 continues for a predetermined time duration $t_2$ as shown by the waveform $(T_2)$ in FIG. 11, $t_2$ being predetermined by the time constant composed of a capacitor $C_3$ and a resistor $R_3$. The output of this multivibrator 96 at the terminal 99 is used as the transmit-receive circuit changing signal.

After a time delay of $d_2$ from the instant when the second multivibrator 96 is triggered-on, the first gate 91 and the second gate 92 will become non-conductive because of the signal input from the inverted output of the second delay means 97, and the third gate 93 will become conductive because of the signal input from the non-inverted output of the second delay means 97.

Figure 11:
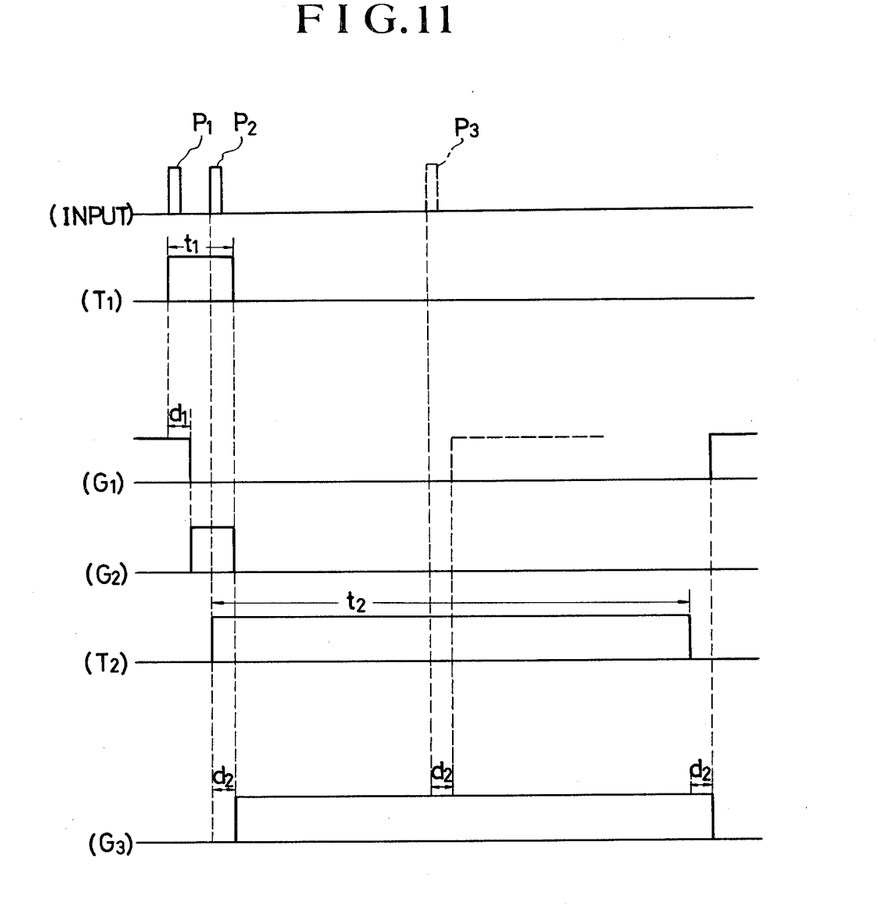
FIG. 11 is a performance time chart illustrating the performance of the switching signal generator means as shown by FIG. 10.

The conductive state of a gate is represented by a high level signal and the non-conductive state of a gate is represented by a low level signal as shown in the waveforms $(G_1)$, $(G_2)$, and $(G_3)$ of FIG. 11. $(G_1)$ represents the state of the first gate 91 as described in the foregoing paragraph, and $(G_2)$ represents the state of the second gate 92 which becomes conductive by the non-inverted output of the first delay means 95 and becomes non-conductive by the inverted output of the second delay means 97. $(G_3)$ represents the state of the third gate 93 which remains conductive as long as the non-inverted output from the second delay means 97 is at a high voltage level.

The time delay $d_2$ is determined by the time constant composed of a capacitor $C_4$ and a resistor $R_4$.

If a third input pulse $P_3$ appears at the input terminal 90 when the third gate 93 is in a conductive state, the third input pulse is transmitted through the third gate 93 to the reset terminal R of the second multivibrator 96, triggering-off the multivibrator 96, and making the third gate 93 non-conductive and the first gate 91 conductive after a time delay of $d_2$. This means that the third input pulse $P_3$ is used to interrupt the transmitting mode and connect the radio telephone equipment in the receiving mode.

If a single noise pulse of a high peak voltage appears at the input terminal by some accident, the first multivibrator 94 will be triggered in a similar way as shown by $P_1$ and $t_1$ of FIG. 11. But the probability in which a second noise pulse appears at the point of $P_2$ pulse of FIG. 11, is very small, and the first multivibrator 94 automatically becomes to a reset state, preventing the misoperation by noise of the second multivibrator 96.

For a design example, the time durations are selected in such a combination as $d_1 = d_2 = 0.2$ second, $t_1 = 0.4$ second, and $t_2 = 10$ second. This combination of the time durations has been proved satisfactory by an experiment.

It will be easily understood that the circuit shown by FIG. 10 can be operated by a pulse signal having an adequate width corresponding to the interval of the successive two pulses $P_1$ and $P_2$. The operation of the circuit of FIG. 10 by a single pulse of an adequate width will be explained in connection with a performance time chart shown by FIG. 12.

Figure 12:
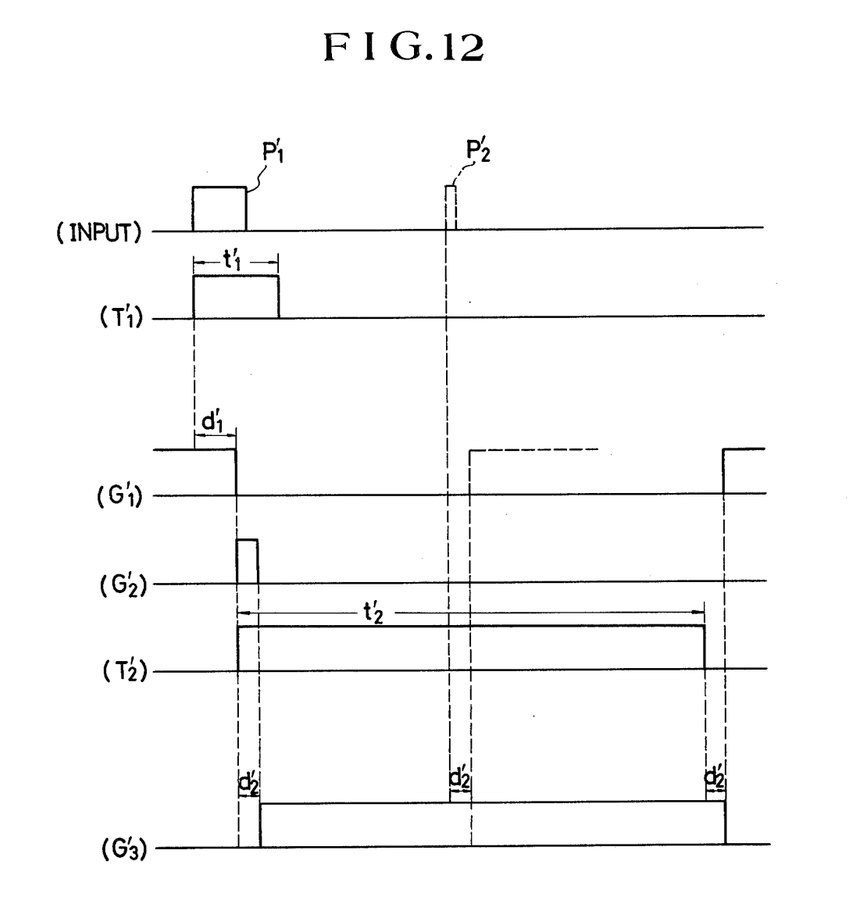
FIG. 12 is another performance time chart illustrating the performance of the switching signal generator means as shown by FIG. 10.

Referring to FIG. 10 and FIG. 12, when a pulse of an adequate width $P_1'$ appears at the input terminal, the first multivibrator 94 is triggered-on and remains in the set state for a predetermined time duration $t_1'$ (refer to $(T_1')$ of FIG. 12). After a time delay of $d_1'$, the second gate 92 becomes conductive. If the width of the pulse $P_1'$ is long, a part of the pulse $P_1'$ is transmitted through the then conductive second gate 92 and triggers-on the second multivibrator 96. The second multivibrator 96 becomes to a set state as shown by the waveform of $(T_2')$ of FIG. 12, the output signal from the second multivibrator 96 connecting the radio telephone equipment in a transmitting mode.

After a time delay of $d_2'$ by the second delay means 97, the first gate 91 and the second gate 92 become non-conductive, and the third gate 93 becomes conductive. It must be noted that, when the width of the pulse $P_1'$ is too long, a part of the pulse can pass the now conductive third gate 93 and can trigger-off the second multivibrator 96. To avoid this misoperation, the pulse $P_1'$ must have a proper width. In one practice of operation, the operator can terminate the generation of the pulse $P_1'$ after he had confirmed the triggering-on of the second multivibrator.

In order to interrupt the transmitting mode and connect the radio telephone equipment in the receiving mode, a second pulse $P_2'$ of a width smaller than $d_2'$ is to be generated at the input terminal 90, and the pulse $P_2'$ is transmitted through the then conductive third gate 93 and triggers-off the second multivibrator 96 in the same way as described in connection with FIG. 11.

For a design example, the time durations are selected in such a combination as $d_1' = 0.5$ second, $d_2' = 0.2$ second, $t_1' = 0.6$ second, and $t_2' = 10$ second. This combination of the time durations has been proved satisfactory by an experiment.

In the embodiments of a switching signal generator means 9 as shown by FIG. 8 and FIG. 10, a monostable multivibrator is used which is automatically restored to the reset state after a predetermined time interval from triggered-on instant. This means that the transmitting mode of the radio telephone equipment is automatically restored to the receiving mode after a predetermined duration. When this automatic restoration to the receiving mode is not required in the operation of the radio telephone communication, a bistable multivibrator, that is, a set-reset type flipflop may be used instead of the monostable multivibrator.

In the embodiment as shown by FIG. 10, a pair of two successive pulses or a single pulse having an adequate width is used to change the circuit to a transmitting connection from a receiving connection, and a single pulse of a relatively short width is used to interrupt the transmitting mode and change the circuit to the receiving connection. But it will be easily understood that a pair of two successive pulses can be used for interrupting the transmission mode to avoid the misoperation by noise.

Figure 13:
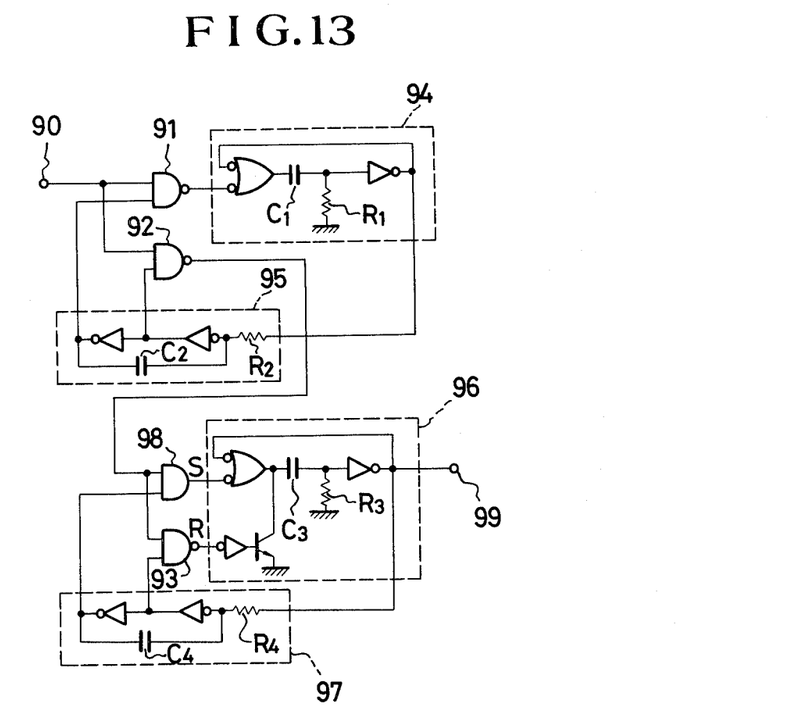
FIG. 13 is a circuit diagram of another embodiment of the switching signal generator means which is used in the system of this invention.

FIG. 13 shows an embodiment of a switching signal generator means in which a pair of successive two pulses is used for interrupting the transmitting mode as well as for changing the circuit of the radio telephone equipment to the transmitting mode. The circuit of FIG. 13 is similar to the circuit of FIG. 10, and in the circuit of FIG. 13, the inverted output from the second delay means 97 is connected to one input of a fourth gate 98, the other input of the gate 98 being the output of the second gate 92. The output of the gate 98 is connected to the set terminal S of the second multivibrator 96.

In operation, the first input pulse triggers-on the first multivibrator 94 and the second input pulse triggers-on the second multivibrator 96 through the second gate 92 and the fourth gate 98. The set state of the multivibrator 96 continues for a predetermined duration if there is not a signal input at the input terminal.

During the time period when the second multivibrator 96 is in the set state, if a pulse appears at the input terminal, this pulse triggers-on the first multivibrator 94 and the second gate 92 will become conductive. If a succeeding pulse does not appear in a due time, however, the first multivibrator 94 will be restored to the reset state in a predetermined time duration and no signal will be transmitted to the third gate 93 through the second gate 92.

During the time period when the second multivibrator 96 is in the set state, if a pair of successive two pulses is generated at the input terminal by the operator, the first pulse of the pulse pair triggers-on the first multivibrator 94 and the second pulse is transmitted through the then conductive second gate 92 to the input of the third gate 93. The third gate 93 is conductive at that time and the output of the third gate 93 triggers-off the second multivibrator 96. Thus the transmitting mode of the radio telephone equipment is interrupted by a pair of successive two pulses.

It will be easily understood and will need no further description that the circuit of FIG. 13 can be operated by a single pulse having a proper width, when the operation of the circuit of FIG. 13 is considered in connection with the performance time chart of FIG. 12.

While the invention has been described in their preferred embodiments with a certain degree of particularity with reference to the accompanying drawings, it is to be understood that various changes and modifications may be made in the invention without departing from the spirit and scope thereof.

What is claimed is:

1. A transmit-receive circuit changing switch system for a radio-telephone equipment comprising:
   a radio-telephone transmitter having a first control signal input, an audio input, and an output;
   a radio-telephone receiver having a second control signal input, an input for receiving radio-frequency energy, and an output for supplying an audio signal;
   antenna change-over switching means having a third control signal input, an antenna being connectible to said antenna change-over switching means, said antenna change-over switching means being selectably connectible to said receives and said transmitter, respectively;
   switching signal generator means having an input for a low-frequency control signal and an output for generating a transmit-receive circuit changing signal of a rectangular waveform from the low-frequency signal, the output of said switching signal generator means being connected to each of said control signal inputs, electroacoustic transducer means selectively connectable as a speaker or a microphone, and wherein the low-frequency signal is generated by said transducer means while in the microphone mode and is transmissible to the input of the switching generator means, the presence of said transmit-receive circuit signal on the first control signal input enables the operation of said transmitter, the absence of said transmit-receive circuit signal disables the operation of said transmitter, the presence of the transmit-receive circuit changing signal on the second control input disables the operation of said receiver, the absence of the transmit-receive signal enables the operation of said receiver, the transmit-receive circuit changing signal being input to said third control input of said antenna change-over switching means for connecting the antenna to the output of said transmitter, wherein the absence of the transmit-receive circuit changing signal connects the antenna to the input of the receiver; and means for selectively connecting said transducer means comprising;
   means for selectively connecting said transducer to said output of said receiver to act as a speaker and to said transmitter audio and said switching generator means input to act as a microphone; said transducer being the source of the low-frequency signal; and
   means for generating a transducer circuit changing signal by detecting the radio-frequency energy input to said receiver, means for generating the transducer circuit changing signal to control said transducer change-over switching means, said transducer being connectible as a microphone by the absence of the transducer circuit changing signal, and as a speaker by the presence of said transducer circuit changing signal.

2. A transmit-receive circuit changing switch system for a radio-telephone equipment comprising:
   a radio-telephone transmitter having a first control signal input and an output;
   a radio-telephone receiver having a second control signal input, an input for receiving radio-frequency energy, and an output for supplying an audio signal;
   antenna change-over switching means having a third control signal input, an antenna being connectible to said antenna change-over switching means, said antenna change-over switching means being selectably connectible to said receiver and said transmitter, respectively;
   switching signal generator means having an input for a low-frequency signal and an output for generating a transmit-receive circuit changing signal of a rectangular waveform from the low-frequency signal, the output of said switching signal generator means being connected to each of said control signal inputs; means for isolating the low-frequency signal from the audio signal, the isolating means being connected to said switching signal generator means input and to the receiver output, and wherein the low-frequency signal is transmissible to the input of the switching generator means, the presence of said transmit-receive circuit signal enables the operation of said transmitter, the absence of said transmit-receive circuit signal disables the operation of said transmitter, the presence of the transmit-receive circuit changing signal on the control input of said receiver disables the operation of said receiver, the absence of the transmit-receive circuit signal enables the operation of said receiver, the transmit-receive circuit changing signal being an input to said third control input of said antenna change-over means for connecting the antenna to the output of said transmitter, and the absence of the transmit-receive circuit changing signal connects the antenna to the input of the receiver; said switching signal generator means comprising;

multivibrator means having an output, a set signal input terminal and a reset signal input terminal, the output of said multivibrator means being the transmit-receive circuit changing signal, said multivibrator means having a set and a reset state;

delay means connected to the output of said multivibrator means and having an output, the output of said delay means being similar to the output of said multivibrator means with a predetermined amount of time delay;

first gate means connected to the low frequency input for transmitting said low-frequency signal to said set signal input terminal of said multivibrator means when said output of said delay means is in a state corresponding to the reset state of said multivibrator means; and second gate means connected to the low-frequency input for transmitting said low-frequency signal to said reset signal input terminal of said multivibrator means when said output of said delay means is in a state corresponding to the set state of said multivibrator means.

3. Transmit-receive circuit changing switch system for a radio telephone equipment according to claim 2 wherein said multivibrator means is a monostable multivibrator which automatically returns to the reset state after having continued the set state for a predetermined duration of time.

4. A transmit-receive circuit changing switch system for a radio-telephone equipment comprising:
a radio-telephone transmitter having a first control signal input and an output;
a radio-telephone receiver having a second control signal input, an input for receiving radio-frequency energy, and an output for supplying an audio signal;
antenna change-over switching means having a third control signal input, an antenna being connectible to said antenna change-over switching means, said change-over switching means being selectably connectible to said receiver and said transmitter, respectively;
switching signal generator means having an input for a low-frequency signal and an output for generating a transmit-receive circuit changing signal of a rectangular waveform from the low-frequency signal, the output of said switching signal generator means being connected to each of said control signal inputs;
means for isolating the low-frequency signal from the audio signal, the isolating means being connected to said switching signal generator means input and to the receiver output, and wherein the low-frequency signal is transmissible to the input of the switching generator means, the presence of said transmit-receive circuit signal enables the operation of said transmitter, the absence of said transmit-receive circuit signal disables the operation of said transmitter, the presence of the transmit-receive circuit changing signal on the control input of said receiver disables the operation of receiver, the absence of the transmit-receive circuit signal enables the operation of said receiver, the transmit-receive circuit changing signal being an input to said third control input of said antenna change-over switching means for connecting the antenna to the output of said transmitter, and the absence of the transmit-receive circuit changing signal connects the antenna to the input of the receiver; said switching signal generator means comprising:

first monostable multivibrator means having a set signal input terminal and an output;

first delay means having a normal and an inverted output, and connected to the output of said first monostable multivibrator means, the normal output of said first delay means being similar to the output of said first monostable multivibrator means with a predetermined amount of time delay;

first gate means connected to the low-frequency input for transmitting said low-frequency signal to the set signal input of said first monostable multivibrator means, said first gate means being controlled by the inverted output of said first delay means;

second multivibrator means having an output, a set signal input terminal and a reset signal input signal, the output of said second multivibrator means being the transmit-receive circuit changing signal;

second gate means connected to the low-frequency input for transmitting said low-frequency signal to the set signal input terminal of said second multivibrator means, said second gate means being controlled by the non-inverted output of said first delay means;

second delay means connected to the output of said second multivibrator means and having a normal and an inverted output, the normal output of said second delay means being similar to the output of said second multivibrator means with a predetermined time delay, and third gate means for transmitting said low-frequency signal to the reset signal input terminal of said second multivibrator means, said third gate means being controlled by the normal output of said second delay means.

5. Transmit-receive circuit changing switch system for a radio telephone equipment according to claim 4 wherein said second multivibrator means is a monostable multivibrator which automatically returns to the reset state after having continued the set state for a predetermined duration of time.

6. A transmit-receive circuit changing switch system for a radio-telephone equipment comprising:
a radio-telephone transmitter having a first control signal input, an input for receiving a modulation signal, and an output for supplying modulated radio-frequency energy;
a radio-telephone receiver having a second control signal input, an input for receiving radio-frequency energy, and an output for supplying an audio signal;
an earplug type electroacoustic reversible transducer which is used as a speaker with said transducer connected to said output of said radio-telephone receiver and is used as a microphone with said transducer connected to said input of said radio-telephone transmitter;
switching signal generator means having an input for a low-frequency pulse signal and an output for a transmit-receive circuit changing signal of a rectangular waveform, said transmit-receive circuit changing signal being generated from said low-frequency pulse signal generated at said earplug type electroacoustic reversible transducer by a specified volcalization of an operator of said radio-telephone equipment, said output of said switching signal generator means being connected to said first, second and third control signal inputs;

an electroacoustic transducer change-over switching means for connecting said earplug type electroacoustic reversible transducer either to said output of said radio-telephone receiver or to said input of said radio-telephone transmitter; and means for generating a transducer circuit changing signal by detecting the radio-frequency energy input to said radio-telephone receiver, said transducer circuit changing signal control said electroacoustic transducer change-over switching means.

* * * * *